United States Patent [19]

Seshimo

[11] Patent Number: 4,759,428

[45] Date of Patent: Jul. 26, 1988

[54] VISCOELASTIC DAMPER

[75] Inventor: Kiyoshi Seshimo, Kanagawa, Japan

[73] Assignee: NHK Spring Co., Ltd., Yokohama, Japan

[21] Appl. No.: 891,866

[22] Filed: Jul. 29, 1986

[51] Int. Cl.[4] .................. F16F 5/00; F16F 9/00; F16F 11/00

[52] U.S. Cl. ..................... 188/312; 188/322.22; 188/322.5

[58] Field of Search ........... 188/268, 312, 316, 321.11, 188/322.5, 322.22; 91/173

[56] References Cited

U.S. PATENT DOCUMENTS

| 1,269,606 | 6/1918 | Hovas | 188/268 |
| 2,875,861 | 3/1954 | Lucien | 188/316 |
| 3,157,070 | 11/1964 | Heidrich | 91/173 X |

FOREIGN PATENT DOCUMENTS

| 3043104 | 7/1981 | Fed. Rep. of Germany | 188/268 |
| 0931062 | 9/1947 | France | 188/316 |
| 60-65930 | 4/1985 | Japan | . |
| 60-65931 | 4/1985 | Japan | . |

Primary Examiner—Andres Kashnikow
Assistant Examiner—Richard Potosnak
Attorney, Agent, or Firm—Albert L. Jeffers

[57] ABSTRACT

A viscoelastic damper which is adapted to control the vibration of a structural member, a tank, a pipe, etc. which may be caused by an earthquake or wind while producing minimum reaction force when the structural member and so on is slowly displaced as a result of the thermal deformation of the member itself or another member connected thereto. Such a property of a viscoelastic damper can be obtained by using dilatant liquid which presents relatively small resistance when the speed of the motion is small and produces progressively great resistance as the speed of the motion increases. To the end of enhancing this favorable property of the viscoelastic damper, the shoulder surfaces that are exposed to the dilatant liquid are rounded. By providing a spiral groove or projection in the member exposed to the dilatant liquid to produce rotational motion between the two ends of the damper, this property is enhanced even more.

5 Claims, 3 Drawing Sheets

VISCOELASTIC DAMPER

BACKGROUND OF THE INVENTION

This invention relates to a viscoelastic damper which is suitable for controlling the vibrations of structural members and in particular to such a viscoelastic damper which offers a relatively small resistance to a low speed motion and a high damping effect to a high-speed vibrational motion.

In various facilities such as nuclear and other power stations, chemical plants, building structures, etc., dampers of various forms are used for the purpose of controlling the vibrational motions of structural members, pipes and tanks which may arise from seismic activities, wind, the motion of fluid contents in pipes and tanks and so on. Normally, such a damper must be be able to allow low-speed motions of the structure which typically arise from thermal deformation of the structure with as little resistance as possible.

Conventionally, such a damper typically consisted of a viscous damper which produces a substantially linear damping effect or a mechanical snubber which makes use of an inertia element. The viscous damper has the advantage of low cost but produces a relatively great resistance to low speed motions and may cause unfavorable reaction forces in the structure to which it is applied. Furthermore, because flow of viscous fluid must be restricted by an orifice or the like in the viscous damper, the pressure of the liquid is substantial and the leakage of the viscous fluid may become a problem. The mechanical snubber has the advantage of presenting very little resistance to a low-speed motion but is very complicated in structure and tends to be expensive.

Japanese Patent Laying-Open Publications Nos. 60-65930 and 60-65931 disclose viscoelastic dampers which make use of dilatant liquid and display a non-linear damping effect. The dilatant liquid presents a very fluid property when the speed of its deformation is small but presents a solid property or greater resistance when the speed of its deformation is great. Therefore, when such liquid is used in a damper for creating a damping effect, one can obtain a damper of a favorable property for the above mentioned applications because the resistance of the damper is great against vibrations and other high speed motions and is small against slow speed motions such as those resulting from thermal deformation of structural members. Furthermore, unlike a conventional viscous damper in which the motion of liquid is restricted by a small orifice or a gap, there is relatively very little pressure build-up in the damper. Therefore, according to such a viscoelastic damper there is less chance of liquid leakage and the sealing structure is simpler because it is required only to deal with liquid of relatively low pressure.

BRIEF SUMMARY OF THE PRESENT INVENTION

The invention of this application was conceived in the process of improving such a viscoelastic damper which is required to present as little resistance as possible to low-speed motions and to produce as effective a damping effect as possible to high-speed vibrational motions.

Thus, a primary object of the present invention is to provided a favorable viscoelastic damper making use of dilatant liquid.

A second object of the present invention is to provide a viscoelastic damper which presents very little resistance to low-speed motions and provides an effective damping effect to high-speed vibrational motions.

According the present invention, such objects are accomplished by providing a viscoelastic damper for controlling the vibration of an object, comprising a first member which defines a chamber, filled with viscoelastic liquid, receiving a part of a second member in substantially liquid tight condition, the viscoelastic liquid having the property of dilatancy, wherein: the first member defines a cylinder, while the second member comprises a large diameter portion which has an outer circumferential surface adjacent to the inner circumferential surface of the cylinder and a pair of small diameter portions which extend axially on either end of the large diameter portion; the large diameter portion and the small diameter portions being connected by rounded curves.

Since the shoulder surfaces connecting the large diameter portions and the small diameter portions are connected by smooth curves, the viscoelastic damper offers very little resistance to slow speed motions without substantially reducing its viscoelastic damping action to high speed motions such as structural vibrations. The smooth curves may consist of sine curves, arcuate curves, elliptic curves and other round curves.

According to a certain aspect of the present invention, a spiral groove or projection is provided in the outer circumferential surface of the large diameter portion so as to produce a rotational inertial effect when the damper is subjected to a high speed motion such as a vibration. Thereby, the damping effect of the viscoelastic damper is increased without reducing its capability of offering very little resistance to a low speed motion. To enhance the inertia effect, at least one end of the viscoelastic damper is preferred to be connected to the other member by way of a ball joint.

BRIEF DESCRIPTION OF THE DRAWINGS

The present invention will now be shown and described in the following in terms of concrete embodiments thereof with reference to the appended drawings, in which.

DETAILED DESCRIPTION OF THE PREFERRED EMBODIMENTS

Figure 1:
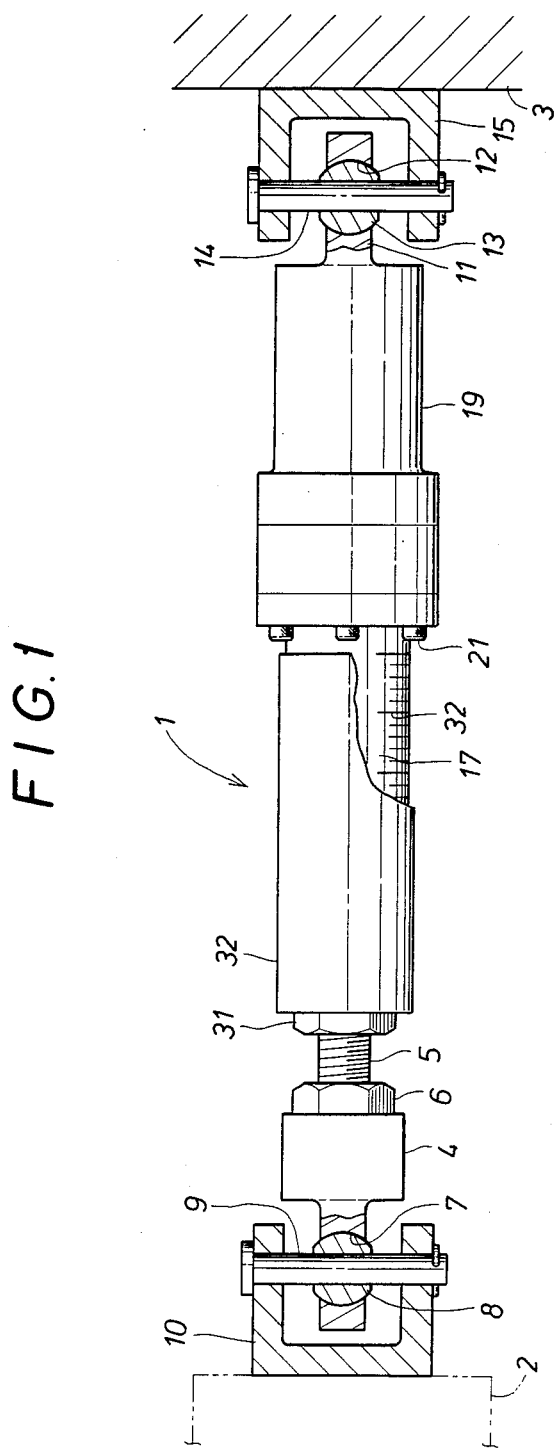
FIG. 1 is a side view of an embodiment of the viscoelastic damper according to the present invention.

FIG. 1 shows a partially broken away external view of a viscoelastic damper according to the present invention which is adapted to be used to control the vibration of a structural member or a pipe.

This viscoelastic damper 1 is connected at its one end to a structural member 2 which is to be vibration-controlled and is supported at its other end by a fixed member 3. The one end of this viscoelastic damper 1 consists of a block 4 which is threaded to a screw rod 5 and secured by a nut 6 which is also threaded to this screw rod 5. This block 4 is further provided with a hole 7 having a spherical inner surface receiving a ball member 8. A pin 9 is passed through a central hole of this ball member 8 and is further passed through a yoke 10 which is fixedly secured to the structural member 2. Thus, this end of the viscoelastic damper 1 is connected to the structural member 2 by way of a ball joint which allows a relative rotation between the structural member 2 and the viscoelastic damper 1 about any rotational axis. Further, the length of the viscoelastic damper 1 can be adjusted by unfastening the nut 6, turning the block 4 relative to the screw rod 5 and fastening the nut 6 again.

The other end of the viscoelastic damper 1 is connected to the fixed member 3 in a similar manner by way of an ear 11 having a hole 12 with a spherical inner surface, a ball member 13 received in this hole 12 and a pin 14 which is passed through a central hole of the ball member 13 and holes provided in a yoke 15 which is fixedly secured to the fixed member 3.

Figure 2:
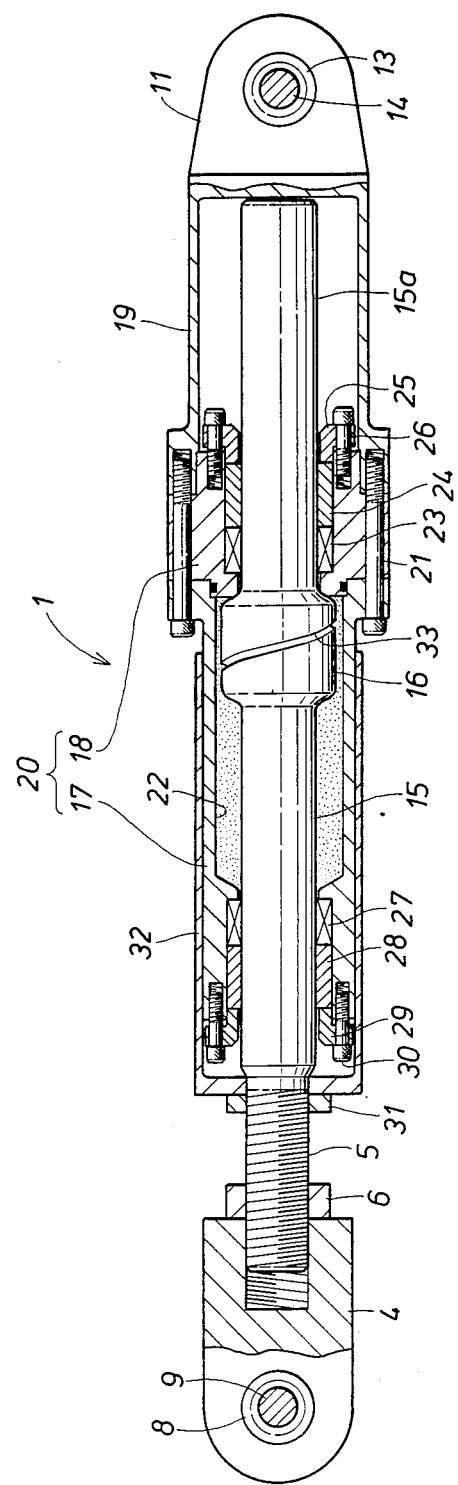
FIG. 2 is a sectional view of the viscoelastic damper of FIG. 1.

FIG. 2 shows the internal structure of this viscoelastic damper 1. This viscoelastic damper 1 includes a rod 15 which is integrally formed with the screw rod 5 on the one end side and is provided with a large diameter portion 16 and an extension 15a extending from the large diameter portion 16 away from the rod 15, all in a coaxial manner.

The large diameter portion 16 is received by a cylinder 20 consisting of a tubular member 17 and an end plate member 18 which are joined together, along with another tubular member 19 which is integrally provided with the ear 11, by a plurality of threaded bolts 21, also in a coaxial manner. The rod 15 extends out of the tubular member 17 from the one end side thereof and the extension 15a extends from an axial hole provided in the end plate member 18 on the other end side of the viscoelastic damper 1 and is covered by the second tubular member 19 having the ear 11.

The chamber 22 defined by the first tubular member 17 and the end plate member 18 is generally filled with viscoelastic liquid having the property of dilatancy. To the end of guiding the motion of the rod 15 and the extension 15a and preventing the leakage of the viscoelastic liquid trapped in the cylinder 20 at both the ends of the cylinder 20, bearing bushings 23 and 27 and packing 24 and 28 are fitted between the rod 15 and the first tubular member 17 and between the extension 15a and the end plate member 18, respectively. Packing holders 25 and 29 which are secured by threaded bolts 26 and 30 to the ends surfaces of the first tubular member 17 and the end plate member 19, respectively, hold the packing 23 and 27 and the bearing bushings 24 and 28 in place.

Further, a third tubular member 32 is fixed to the screw rod 5 by way of a nut 31 in a coaxial manner and this tubular member 32 is fitted over the first tubular member 17 in a coaxial manner while maintaining a certain gap therebetween. As best shown in FIG. 1, the external surface of the first tubular member 17 is provided with a scale of gradation 32 which can be used for evaluating the mutual displacement between the first end and the second end of this viscoelastic damper 1.

The liquid in the chamber 22 is preferably provided with a dilatant property. A normal viscous damper has a substantially linear property and presents a resistance which is substantially proportion to the speed of the motion. However, in a damper which makes use of a dilatant liquid, the resistance progressively increases as the speed of the motion increases. This property is preferable in certain applications, for instance in controlling the vibration of a structural member so that any vibrational motion can be positively controlled with a high damping factor but a low-speed gradual motion of the member, for instance resulting from thermal deformation of the member or other members connected thereto, may be subjected to an extremely small resistance. Thereby, various forms of stress acting upon the structural member is minimized.

Dilatancy is a property found in liquids which are suspended minute particles having special properties. For instance, epoxy resin or phenolic resin containing pigment, such as carbon, zinc oxide, etc, and printing inks, water solution of potassium silicate, water or oil suspending clay and so on display such property. When dilatant liquid is deformed slowly the particles suspended in the liquid maintain their closely packed state and liquid content lubricates the relative motion between the particles in the course of the deformation. On the other hand, when the dilatant liquid is deformed rapidly, the closely packed state of the suspended particles is destroyed and the dilatant liquid displays the property of a relatively solid substance.

Therefore, because the dilatant liquid is trapped in the cylinder chamber 22, the viscoelastic damper 1 displays a high resistive force against high speed motion such as vibrations but offers substantially no resistive force against a slow motion which typically arises as a result of thermal expansion. In the embodiment shown in FIGS. 1 to 3, the outer circumferential surface of the large diameter portion 16 is adjacent to the inner circumferential surface of the chamber 22 leaving a small gap therebetween for instance approximately 5 mm, and most of the viscous effect is produced by this gap because the viscous resistance of liquid is approximately inversely proportional to the width of such a gap.

Figure 3:
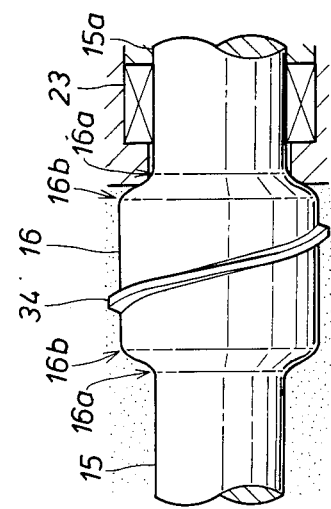
FIG. 3 is a magnified view of part of FIG. 2.

Furthermore, according to the present invention, as shown in FIG. 3, since the root and the shoulder surfaces 16a and 16b of the large diameter portion 16 are rounded for instance by sine curves, arcuate curves and other curves, the speed of the deformation of the dilatant liquid in the chamber 22 is slower than otherwise and the viscoelastic damper 1 produces even less resistance when the large diameter portion 16 moves in the chamber 22 at slow speed. However, when the large diameter portion 16 moves in the chamber 22 at high speed, the rounding of the root and shoulder surfaces 16a and 16b make very little difference in the resistive force which the large diameter portion 16 receives from the dilatant liquid.

Additionally, according to the present embodiment, as best shown in FIG. 3, a spiral groove 33 is provided in the outer circumferential surface of the large diameter portion 16. This groove 33 produce substantially no effect when the speed of the motion of the large diameter portion 16 is low, but produces a relative rotational motion between the rod 15 and the cylinder 20 at high speeds of portion 16 in chamber 22. Since the two ends of the viscoelastic damper 1 are received by the ball joints as best shown in FIG. 1 which accommodates the oscillating rotational motions of the rod 5 and the cylinder 20 relative to the members 2 and 3 to which they are attached, a certain inertia effect is introduced into the action of the viscoelastic damper 1 when it is subjected to a high speed vibrational motion, and the viscoelastic damper 1 of this embodiment can produce the effect of a mechanical snubber in particular by the inertia of the cylinder 20 and the second tubular member 19.

Figure 4:
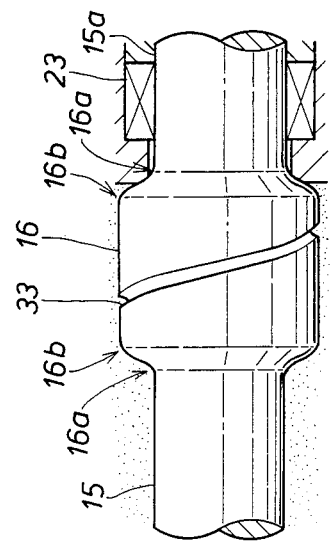
FIG. 4 is a view similar to FIG. 3 showing another embodiment of the present invention.

FIG. 4 shows another embodiment of the present invention. According to this embodiment, a spiral projection 34 is integrally provided on the outer circumferential surface of the large diameter portion 16. This spiral projection produces a substantially same effect as the spiral groove 33.

Although the present invention has been shown and described with reference to the preferred embodiments thereof, it should not be considered as limited thereby. Various possible modifications and alterations could be conceived of by one skilled in the art to any particular embodiment, without departing from the scope of the invention, for instance, the configurations of the spiral groove 33 and the spiral projection 34 in particular the lead angles thereof can be selected according to the need of each particular application. Also, the joints provided at both the ends of the viscoelastic damper may be of any type as long as either one of them allows a relative rotational motion at least over a small angle. And the dilatant liquid can be selected from many known liquids having dilatant property.

What we claim is:

1. A viscoelastic damper for controlling the vibration of an object, said damper comprising a cylindrical first member having a chamber therein, a viscoelastic dilatant fluid in said chamber, a second member sealing received in said chamber, said second member including a large diameter portion having an outer circumferential surface disposed adjacent to an inner circumferential surface of said cylinder, a pair of small diameter portions extending respectively axially from the respective ends of said large diameter portion, and interconnecting portions for connecting said large diameter portion with said small diameter portions, said interconnecting portions having rounded shoulders and roots, and a spiral groove in said outer circumferential surface, said groove interacting with said fluid at high axial speed motion of said large diameter portion relative to said cylinder to cause rotational movement of said large diameter portion relative to said cylinder.

2. A viscoelastic damper for controlling the vibration of an object, said damper comprising a cylindrical first member having a chamber therein, a viscoelastic dilatant fluid in said chamber, a second member sealing received in said chamber, said second member including a large diameter portion having an outer circumferential surface disposed adjacent to an inner circumferential surface of said cylinder, a pair of small diameter portions extending respectively axially from the respective ends of said large diameter portion, and interconnecting portions for connecting said large diameter portion with said small diameter portions, said interconnecting portions having rounded shoulders and roots, and a spiral projection in said outer circumferential surface, said projection interacting with said fluid at high axial speed motion of said large diameter portion relative to said cylinder to cause rotational movement of said large diameter portion relative to said cylinder.

3. A viscoelastic damper as defined claim 1 or 2, wherein at least either one of the two ends of the viscoelastic damper is adapted to be connected to another member by way of a joint which allows relative rotational motion of the damper at least over a small angle.

4. A viscoelastic damper as defined in claims 1 or 2, wherein the interconnecting portions are defined by sinusoidally shaped curves.

5. A viscoelastic damper as defined in claims 1 or 2 wherein the interconnecting portions are defined by arcuate curves.

* * * * *